United States Patent [19]
Youngs

[11] Patent Number: 5,865,216
[45] Date of Patent: Feb. 2, 1999

[54] SYSTEM FOR HOUSING SECONDARILY CONTAINED FLEXIBLE PIPING

[75] Inventor: Andrew Youngs, Granger, Ind.

[73] Assignee: Advanced Polymer Technology, Inc., Muskegon, Mich.

[21] Appl. No.: 555,089

[22] Filed: Nov. 8, 1995

[51] Int. Cl.$^6$ .................................................. F16L 11/00
[52] U.S. Cl. ......................... 138/135; 138/113; 138/114; 138/127; 138/124; 138/137
[58] Field of Search .................................... 138/113, 114, 138/123–127, 129–131, 137, 140, 143, 144, 135

[56] References Cited

U.S. PATENT DOCUMENTS

| | | | |
|---|---|---|---|
| 216,286 | 6/1879 | Miller | 137/236.1 |
| 244,752 | 7/1881 | Hunter et al. | 254/134.5 |
| 272,833 | 2/1883 | Goodfellow | 254/134.3 R |
| 286,938 | 10/1883 | Martin | 174/37 |
| 291,715 | 1/1884 | Greives et al. | 174/32 |
| D. 309,308 | 7/1990 | Webb | D15/7 |
| D. 313,418 | 1/1991 | Webb | D15/7 |
| 347,804 | 8/1886 | Blackmore et al. | 285/45 |
| 430,010 | 6/1890 | Flad | 174/11 R |
| 470,946 | 3/1892 | Munsie | 254/134.3 R |
| 648,128 | 4/1900 | Kinniburgh | 137/356 |
| 745,351 | 12/1903 | Hungerford | 137/236.1 |
| 813,918 | 2/1906 | Schmitz | 165/141 |
| 997,434 | 7/1911 | Barnes | 137/372 |
| 1,188,446 | 6/1916 | Haines | 137/234.6 |
| 1,375,363 | 4/1921 | Cary et al. | 222/135 |
| 1,986,789 | 1/1935 | Bennett | 174/24 |
| 2,013,193 | 9/1935 | Stadtfeld | 137/75 |
| 2,050,968 | 8/1936 | Gottwald et al. | 138/108 |
| 2,093,114 | 9/1937 | Sonnenfeld | 174/25 R |
| 2,113,204 | 4/1938 | Wasser | 138/98 |
| 2,129,924 | 9/1938 | Galbraith | 220/86.1 |
| 2,149,602 | 3/1939 | Horvath | 415/168.1 |
| 2,306,331 | 12/1942 | Elmer | 174/70 R |
| 2,325,565 | 7/1943 | Williams | 405/184 |
| 2,336,150 | 12/1943 | Horvath | 210/170 |
| 2,347,912 | 5/1944 | Komives | 29/421.1 |
| 2,487,939 | 11/1949 | Norton | 285/15 |
| 2,507,597 | 5/1950 | Holdridge | 137/234.6 |
| 2,546,348 | 3/1951 | Shuman | 285/15 |

(List continued on next page.)

FOREIGN PATENT DOCUMENTS

| | | |
|---|---|---|
| 0207015 | 6/1986 | European Pat. Off. . |
| 0343884 | 11/1989 | European Pat. Off. . |
| 1529813 | 10/1967 | France . |
| 1425489 | 5/1969 | Germany . |

OTHER PUBLICATIONS

Anamet Electrical, Inc; Anaconda Sealite.
Supplementary European Search Report Dated May 27, 1994 for EPO Application No. EP 93909213.

*Primary Examiner*—Patrick F. Brinson
*Attorney, Agent, or Firm*—Young & Basile, P.C.

[57] ABSTRACT

A system for housing secondarily contained flexible piping comprises a flexible conduit resistant to mechanical stresses, the conduit adapted to surround the secondarily contained flexible piping. The conduit comprises a metallic core and a thermoplastic jacket. The secondarily contained flexible piping comprises an inner supply pipe, wherein the inner pipe is comprised of a first, inner layer fabricated from nylon, a second, intermediate layer comprising a nylon reinforced wrap, and a third, outer layer comprising a polyethylene material, the nylon inner material, the nylon wrap and the polyethylene outer layer being extruded simultaneously to form the inner pipe. The secondarily contained flexible piping further comprises a flexible outer secondary containment pipe within which the inner supply pipe is carried, the outer pipe being fabricated from a fuel impervious material and having a plurality of radially projecting flanges disposed between the inner supply pipe and the outer secondary containment pipe, to provide a locking engagement of the pipes with respect to each other and to provide for a flow passage between the pipes.

37 Claims, 2 Drawing Sheets

U.S. PATENT DOCUMENTS

| | | | |
|---|---|---|---|
| 2,569,110 | 9/1951 | McGillis et al. | 137/416 |
| 2,573,366 | 10/1951 | Scholl | 285/294.1 |
| 2,649,769 | 8/1953 | Kaiser | 137/368 |
| 2,658,527 | 11/1953 | Kaiser | 137/340 |
| 2,735,448 | 2/1956 | Phelps, Jr. | 138/113 |
| 2,740,427 | 4/1956 | Swan | 138/122 |
| 2,766,614 | 10/1956 | Cook | 73/46 |
| 2,800,145 | 7/1957 | Peierls et al. | 285/256 |
| 2,913,011 | 11/1959 | Noyes et al. | 138/133 |
| 2,952,390 | 9/1960 | Fowler et al. | 222/63 |
| 2,956,586 | 10/1960 | Zeigler et al. | 137/563 |
| 3,011,829 | 12/1961 | Wiseman | 222/146.6 |
| 3,016,928 | 1/1962 | Brandt | 141/45 |
| 3,047,026 | 7/1962 | Kahn | 138/122 |
| 3,073,351 | 1/1963 | Nichols | 138/131 |
| 3,117,596 | 1/1964 | Kahn | 138/122 |
| 3,183,723 | 5/1965 | Deters | 73/40.5 R |
| 3,221,758 | 12/1965 | Morse | 137/15 |
| 3,245,701 | 4/1966 | Leopold, Jr. et al. | 285/148.13 |
| 3,367,370 | 2/1968 | Sherlock | 138/104 |
| 3,459,229 | 8/1969 | Croft | 138/90 |
| 3,464,450 | 9/1969 | Steffenini | 138/113 |
| 3,490,496 | 1/1970 | Stearns | 138/112 |
| 3,531,264 | 9/1970 | Greipel | 48/193 |
| 3,531,265 | 9/1970 | Dille | 48/201 |
| 3,543,377 | 12/1970 | Bremner | 29/234 |
| 3,559,408 | 2/1971 | Earnhart | 405/36 |
| 3,561,493 | 2/1971 | Maillard et al. | 138/141 |
| 3,580,289 | 5/1971 | James et al. | 138/121 |
| 3,581,776 | 6/1971 | Sheahan | 138/108 |
| 3,619,474 | 11/1971 | Beck | 174/19 |
| 3,672,103 | 6/1972 | Kost | 52/20 |
| 3,672,180 | 6/1972 | Davis | 62/48.2 |
| 3,688,801 | 9/1972 | Rohrer | 138/97 |
| 3,720,235 | 3/1973 | Schrock | 138/137 |
| 3,721,270 | 3/1973 | Wittgenstein | 138/104 |
| 3,732,902 | 5/1973 | Muller | 141/198 |
| 3,753,287 | 8/1973 | Ziemek et al. | 29/470.5 |
| 3,756,291 | 9/1973 | McGahey et al. | 141/45 |
| 3,766,949 | 10/1973 | Champleboux et al. | 138/129 |
| 3,791,422 | 2/1974 | Johnson et al. | 141/11 |
| 3,799,440 | 3/1974 | Goss et al. | 239/120 |
| 3,802,456 | 4/1974 | Wittgenstein | 137/312 |
| 3,814,148 | 6/1974 | Wostl | 141/98 |
| 3,837,364 | 9/1974 | Jenner | 464/175 |
| 3,841,671 | 10/1974 | Walker | 285/148.21 |
| 3,863,687 | 2/1975 | Alguist | 141/45 |
| 3,871,408 | 3/1975 | Wood et al. | 138/137 |
| 3,905,398 | 9/1975 | Johansen et al. | 138/124 |
| 3,907,010 | 9/1975 | Burtis et al. | 141/45 |
| 3,926,230 | 12/1975 | Stary et al. | 141/45 |
| 3,929,957 | 12/1975 | Holden et al. | 264/150 |
| 3,974,862 | 8/1976 | Fuhrmann | 138/37 |
| 3,982,776 | 9/1976 | Payne | 285/24 |
| 3,995,472 | 12/1976 | Murray | 73/40 |
| 4,009,739 | 3/1977 | Weathford | 141/59 |
| 4,009,985 | 3/1977 | Hirt | 431/5 |
| 4,010,581 | 3/1977 | Keturi et al. | 52/220.2 |
| 4,010,779 | 3/1977 | Pollock et al. | 141/44 |
| 4,014,369 | 3/1977 | Kobres, Jr. | 138/112 |
| 4,018,252 | 4/1977 | Burtis et al. | 141/45 |
| 4,020,641 | 5/1977 | Takada | 405/184 |
| 4,036,617 | 7/1977 | Leonard et al. | 62/50.7 |
| 4,058,147 | 11/1977 | Stary et al. | 141/45 |
| 4,062,376 | 12/1977 | McGrath | 137/312 |
| 4,090,525 | 5/1978 | Potter | 137/171 |
| 4,098,298 | 7/1978 | Vohrer | 138/122 |
| 4,098,308 | 7/1978 | Purdum | 141/285 |
| 4,100,758 | 7/1978 | Mayer | 62/54 |
| 4,110,947 | 9/1978 | Murray et al. | 52/249 |
| 4,111,466 | 9/1978 | Deregibus | 285/133 R |
| 4,122,968 | 10/1978 | Germain | 220/86.2 |
| 4,130,139 | 12/1978 | Haren | 138/125 |
| 4,132,083 | 1/1979 | McGrath | 405/184 |
| 4,149,568 | 4/1979 | Kuntz | 138/114 |
| 4,157,101 | 6/1979 | Ross | 138/130 |
| 4,157,104 | 6/1979 | Lofquist, Jr. | 141/292 |
| 4,157,194 | 6/1979 | Takahashi | 285/3 |
| 4,172,474 | 10/1979 | Stahle | 138/132 |
| 4,172,607 | 10/1979 | Norton | 285/236 |
| 4,182,581 | 1/1980 | Uehara et al. | 405/43 |
| 4,232,736 | 11/1980 | Pillette | 166/53 |
| 4,250,927 | 2/1981 | Newburg | 138/113 |
| 4,274,549 | 6/1981 | Germain | 220/86.2 |
| 4,309,128 | 1/1982 | Williams | 405/154 |
| 4,310,033 | 1/1982 | Deters | 141/44 |
| 4,318,835 | 3/1982 | Clarke | 264/36.16 |
| 4,330,017 | 5/1982 | Satoh et al. | 138/126 |
| 4,333,451 | 6/1982 | Paluch | 128/205.12 |
| 4,415,389 | 11/1983 | Medford et al. | 156/91 |
| 4,431,031 | 2/1984 | Ettlinger | 138/109 |
| 4,436,987 | 3/1984 | Thalmann et al. | 219/535 |
| 4,449,853 | 5/1984 | Mennella et al. | 405/184 |
| 4,492,089 | 1/1985 | Rohner et al. | 62/50.7 |
| 4,510,974 | 4/1985 | Natori et al. | 138/137 |
| 4,521,037 | 6/1985 | Knox | 285/15 |
| 4,561,292 | 12/1985 | Pugnale et al. | 73/49.2 |
| 4,565,351 | 1/1986 | Conti et al. | 138/108 X |
| 4,566,504 | 1/1986 | Furrow et al. | 141/59 |
| 4,568,925 | 2/1986 | Butts | 340/605 |
| 4,570,678 | 2/1986 | Ziemek et al. | 138/113 |
| 4,570,686 | 2/1986 | Devine | 141/286 |
| 4,573,829 | 3/1986 | Keene et al. | 405/157 |
| 4,612,744 | 9/1986 | Shamash | 52/220.1 |
| 4,615,362 | 10/1986 | Hartman et al. | 141/86 |
| 4,618,168 | 10/1986 | Thalmann et al. | 285/21.2 |
| 4,620,569 | 11/1986 | von Glanstatten et al. | 138/132 |
| 4,629,216 | 12/1986 | Pedersen | 285/21.2 |
| 4,639,164 | 1/1987 | Pugnale et al. | 405/54 |
| 4,643,460 | 2/1987 | Lieberg | 285/112 |
| 4,644,780 | 2/1987 | Jeter | 73/40.5 R |
| 4,659,251 | 4/1987 | Petter et al. | 405/52 |
| 4,662,655 | 5/1987 | Fliervoet et al. | 285/24 |
| 4,667,505 | 5/1987 | Sharp | 73/40.5 R |
| 4,678,370 | 7/1987 | Allen | 405/154 |
| 4,682,911 | 7/1987 | Moreland | 405/53 X |
| 4,685,831 | 8/1987 | Mahoney | 405/156 |
| 4,700,751 | 10/1987 | Federick | 138/149 |
| 4,702,645 | 10/1987 | Skinner et al. | 405/154 |
| 4,706,712 | 11/1987 | Oglesby et al. | 138/126 |
| 4,718,568 | 1/1988 | Dal Palû | 220/86.2 |
| 4,739,648 | 4/1988 | Horner | 73/49.2 |
| 4,756,339 | 7/1988 | Buluschek | 138/115 |
| 4,758,455 | 7/1988 | Campbell et al. | 428/35.9 |
| 4,767,237 | 8/1988 | Cosman et al. | 405/157 |
| 4,770,562 | 9/1988 | Müller et al. | 405/154 |
| 4,778,310 | 10/1988 | Moreland | 405/270 |
| 4,779,652 | 10/1988 | Sweeney | 138/113 |
| 4,786,088 | 11/1988 | Ziu | 285/123.1 |
| 4,787,772 | 11/1988 | Wagner | 405/53 |
| 4,796,669 | 1/1989 | St. Onge | 138/97 |
| 4,796,676 | 1/1989 | Hendezshot et al. | 141/83 |
| 4,802,938 | 2/1989 | Kitami et al. | 156/149 |
| 4,805,444 | 2/1989 | Webb | 73/40.5 R |
| 4,842,207 | 6/1989 | Faeth | 141/45 |
| 4,865,359 | 9/1989 | Roberts | 285/94 |
| 4,870,856 | 10/1989 | Sharp | 73/40.5 R |
| 4,874,268 | 10/1989 | Akesaka | 405/184 |
| 4,881,576 | 11/1989 | Kitami | 138/125 |
| 4,886,304 | 12/1989 | Kunzman | 285/104 |
| 4,886,305 | 12/1989 | Martin | 285/123.17 |
| 4,887,647 | 12/1989 | Igarashi et al. | 138/126 |

| | | | |
|---|---|---|---|
| 4,896,705 | 1/1990 | Podgers et al. | 141/86 |
| 4,903,719 | 2/1990 | Rains | 137/15 |
| 4,906,496 | 3/1990 | Hosono et al. | 138/113 X |
| 4,926,899 | 5/1990 | Argandona | 137/364 |
| 4,930,544 | 6/1990 | Ziu | 138/113 |
| 4,932,257 | 6/1990 | Webb | 73/40.5 R |
| 4,951,720 | 8/1990 | Grantham | 141/44 |
| 4,958,957 | 9/1990 | Berg et al. | 405/55 |
| 4,967,809 | 11/1990 | Faeth | 141/59 |
| 4,968,179 | 11/1990 | Frahm | 405/53 |
| 4,971,477 | 11/1990 | Webb et al. | 405/154 |
| 4,984,604 | 1/1991 | Nishimura | 138/126 |
| 4,991,626 | 2/1991 | Grantham | 137/614.03 |
| 5,005,613 | 4/1991 | Stanley | 141/45 |
| 5,018,260 | 5/1991 | Ziu | 24/555 |
| 5,022,459 | 6/1991 | Chiles et al. | 165/11.1 |
| 5,030,033 | 7/1991 | Heintzelman et al. | 405/128 |
| 5,037,143 | 8/1991 | Sanders et al. | 285/258 |
| 5,038,833 | 8/1991 | Brunnhofer | 138/137 |
| 5,040,408 | 8/1991 | Webb | 73/40.5 R |
| 5,040,577 | 8/1991 | Pope | 141/59 |
| 5,042,537 | 8/1991 | Grantham | 141/59 |
| 5,051,034 | 9/1991 | Goodman | 405/157 |
| 5,052,444 | 10/1991 | Messerly et al. | 138/125 |
| 5,056,569 | 10/1991 | Walker et al. | 141/44 |
| 5,060,509 | 10/1991 | Webb | 73/40.5 R |
| 5,076,329 | 12/1991 | Brunnhofer | 138/137 |
| 5,089,074 | 2/1992 | Winter et al. | 156/244.13 |
| 5,093,166 | 3/1992 | Nishimura | 428/36.2 |
| 5,098,221 | 3/1992 | Osborne | 405/52 |
| 5,101,918 | 4/1992 | Smet | 175/424 |
| 5,102,012 | 4/1992 | Foster | 220/40 |
| 5,109,600 | 5/1992 | Holden et al. | 29/890.144 |
| 5,129,428 | 7/1992 | Winter et al. | 138/104 |
| 5,129,686 | 7/1992 | Sanders et al. | 285/258 |
| 5,135,324 | 8/1992 | Bravo | 405/52 |
| 5,141,260 | 8/1992 | Burwell | 285/123.17 |
| 5,145,545 | 9/1992 | Winter et al. | 156/244.13 |
| 5,148,836 | 9/1992 | Lawrence | 138/121 |
| 5,152,635 | 10/1992 | Ziu | 405/52 |
| 5,156,191 | 10/1992 | Walker et al. | 138/113 |
| 5,156,699 | 10/1992 | Nakano et al. | 156/149 |
| 5,186,357 | 2/1993 | Foster | 222/1 |
| 5,186,502 | 2/1993 | Martin | 285/133.1 |
| 5,199,752 | 4/1993 | Sanders et al. | 285/258 |
| 5,256,233 | 10/1993 | Winter et al. | 156/244.13 |
| 5,257,652 | 11/1993 | Lawrence | 141/86 |
| 5,259,418 | 11/1993 | Hamrick | 138/104 |
| 5,263,794 | 11/1993 | Webb | 405/52 |
| 5,267,670 | 12/1993 | Foster | 222/1 |
| 5,279,322 | 1/1994 | Winter et al. | 138/111 |
| 5,279,333 | 1/1994 | Lawrence | 138/121 |
| 5,281,757 | 1/1994 | Marin et al. | 174/23 R |
| 5,285,744 | 2/1994 | Grantham et al. | 141/59 |
| 5,285,826 | 2/1994 | Sanders et al. | 138/114 |
| 5,297,896 | 3/1994 | Webb | 405/52 |
| 5,305,798 | 4/1994 | Driver | 138/98 |
| 5,343,738 | 9/1994 | Skaggs | 73/40.5 R |
| 5,383,087 | 1/1995 | Noone et al. | 361/215 |
| 5,433,252 | 7/1995 | Wolf et al. | 138/113 |
| 5,488,975 | 2/1996 | Chiles et al. | 138/125 |
| 5,490,419 | 2/1996 | Webb | 73/40.5 R |
| 5,527,130 | 6/1996 | Webb | 405/52 |
| 5,553,971 | 9/1996 | Osborne | 405/52 |
| 5,567,083 | 10/1996 | Osborne | 405/154 |
| 5,590,981 | 1/1997 | Osborne | 405/154 |

SYSTEM FOR HOUSING SECONDARILY CONTAINED FLEXIBLE PIPING

BACKGROUND OF THE INVENTION

The present invention relates to secondary containment systems and especially, although not exclusively to a piping construction and a system for housing secondarily contained piping above-ground and underwater for hydrocarbon storage and delivery systems.

A secondary containment system is one which functions to collect and contain the fluids leaking out of another (primary) containment system. For example, a primary containment system may store and deliver gasoline at a filling station. A secondary containment system would collect and contain the same gasoline if a primary delivery pipe should rupture or otherwise spill the gasoline. Secondary containment systems have been developed to overcome the environmental problems that have been encountered with respect to leakage of hazardous fluids from tanks and pipe lines. As indicated, this can be a particular problem with respect to underwater installations in which undetected leakage of hazardous fluids into the surrounding water over long periods of time can produce harmful conditions for both sea life and human beings, as well as extensive pollution which is difficult and expensive to clean.

Today there is also great public concern with above-ground piping, because chemicals are penetrating into underground water supplies, contaminating public drinking water and making some of the food supply unusable, among other things. The entire environment may be in the process of being degraded to a serious level which tends to cast doubt on the future availability of safe water. Therefore, many government agencies have enacted, and continue to enact laws which require a secondary containment system designed to capture and contain the spilled gasoline or other liquid materials in order to prevent them from leaking into the earth below any above-ground piping, or into the water surrounding underwater piping. The captured gasoline or other liquid material may then be pumped out of the secondary container for proper disposal. This eliminates the possibility of gasoline spillage to contaminate surrounding water or underground water supply.

Manufacturers of containment systems have responded by developing and producing a variety of secondary containment systems for conventional underground piping which are designed to contain and prevent any leakage from escaping into the environment. Many of these systems have proven to be effective containment systems but have been found to be difficult and costly to install.

In addition, these systems are not applicable for use in above-ground or underwater installations. These particular installations have special considerations which include, but are not limited to: piping flexible enough to bend around existing structures and/or sea terrain; both the primary and secondary piping should be removable for repairs and/or replacement; the primary and secondary piping should be protected from external damage, and from degradation from ultraviolet rays; the piping system should be waterproof; and the piping should be strong enough to be protected from external loads such as boat props and the like.

It can be very difficult and expensive to meet all of the many different environmental and safety standards at a reasonably acceptable cost, particularly in light of the many state and local governments writing individual laws that impose a wide variety of standards which the manufacturers of such systems must meet.

Accordingly, an object of the invention is to provide a new and improved secondary containment system which will draw all spilled fluids that may leak from a primary supply pipe to a preselected collecting point which may be monitored. It is a further object of the present invention to provide a system for housing such a secondary containment system. Still further, it is an object of the present invention to provide such a housing system which is flexible, yet provides rigidity and protection against fire. Yet still further, it is an object of the present invention to provide such a housing system which allows for both the primary and secondary piping to be removable for repairs and/or replacement. It is another object of the present invention to protect the primary and secondary piping from external damage, and from degradation from ultraviolet rays. It is yet another object of the present invention to provide such a housing system which is waterproof. Still further, it is another object of the present invention to provide a housing system which is strong enough to be protected from external loads such as boat props and the like.

A further object of the present invention is to provide a practical secondary containment system within a housing system which may be manufactured in a factory, shipped and installed at a reasonably low cost in a fully usable manner; and yet one which meets all requirements of the environment within which it must be used. It is a further object of the present invention to provide an economical, easily installed, highly durable and environmentally secure flexible piping system within a housing system.

SUMMARY OF THE INVENTION

The present invention addresses and solves the problems enumerated above. The present invention comprises a system for housing secondarily contained flexible piping. The housing system comprises a flexible conduit resistant to mechanical stresses, the conduit adapted to surround the secondarily contained flexible piping. The conduit comprises a metallic core and a thermoplastic jacket. The secondarily contained flexible piping comprises an inner supply pipe, wherein the inner pipe is comprised of a first, inner layer fabricated from nylon, a second, intermediate layer comprising a nylon reinforced wrap, and a third, outer layer comprising a polyethylene material, the nylon inner material, the nylon wrap and the polyethylene outer layer being extruded simultaneously to form the inner pipe. The secondarily contained flexible piping further comprises a flexible outer secondary containment pipe within which the inner supply pipe is carried, the outer pipe being fabricated from a fuel impervious material and having a plurality of radially projecting flanges disposed between the inner supply pipe and the outer secondary containment pipe, to provide a locking engagement of the pipes with respect to each other and to provide for a flow passage between the pipes.

BRIEF DESCRIPTION OF THE DRAWINGS

Other objects, features and advantages of the present invention will become apparent by reference to the following detailed description and drawings, in which.

DETAILED DESCRIPTION OF THE PREFERRED EMBODIMENTS

Figure 1:
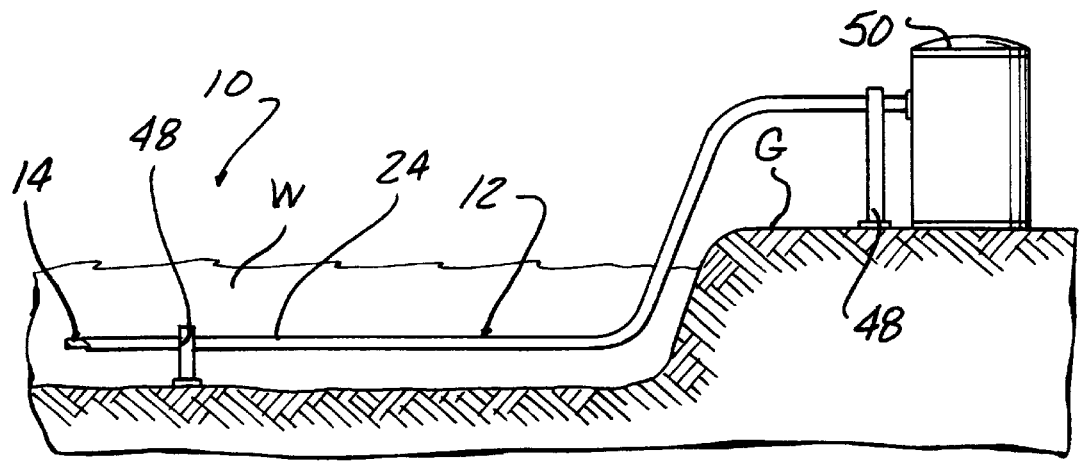
FIG. 1 is a somewhat schematic layout of the present invention, shown in an underwater-to-above-ground application.
Figure 2:
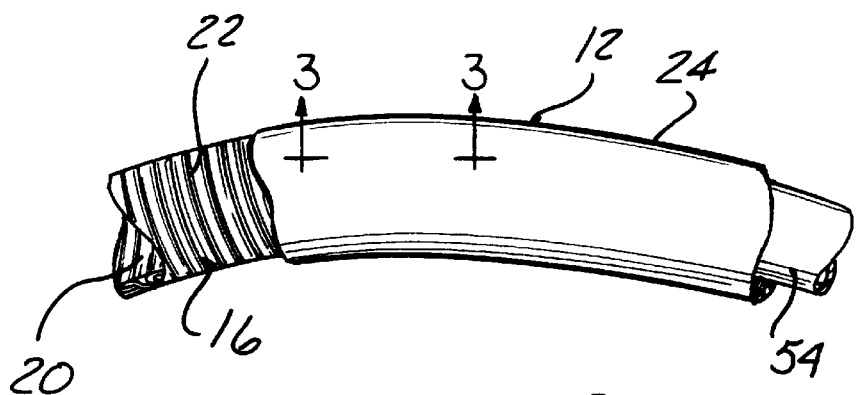
FIG. 2 is an enlarged, partially cut away, partially cross sectioned view of the metallic conduit used in the housing system of the present invention, showing a non-secondarily contained primary pipe extending therefrom.
Figure 4:
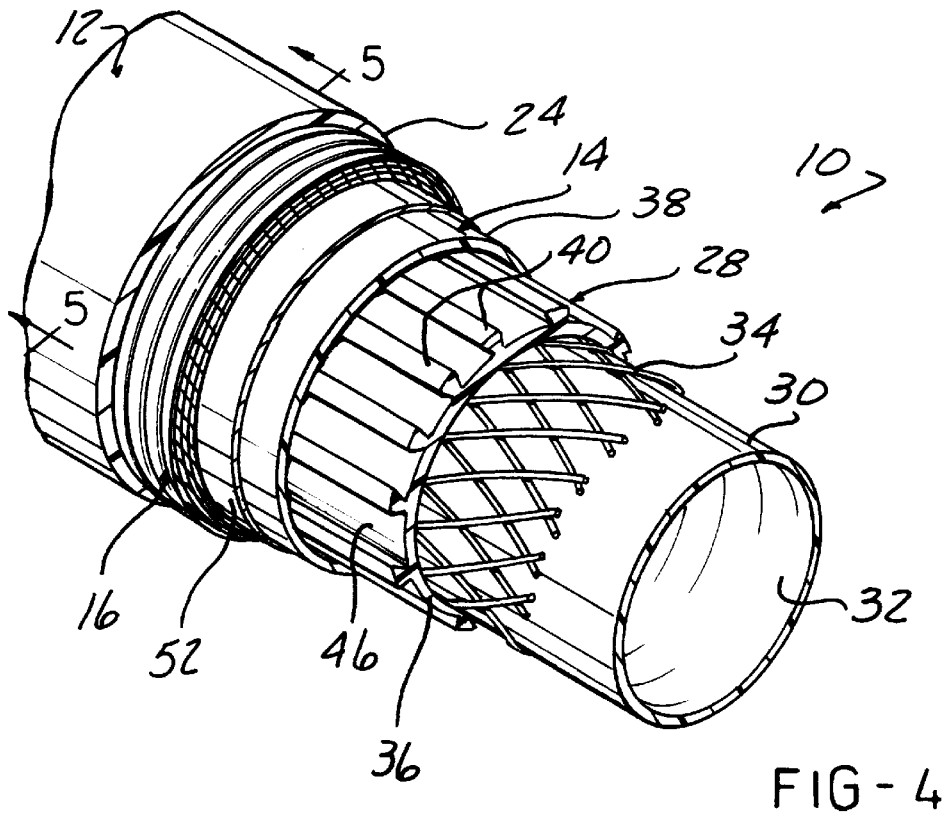
FIG. 4 is an enlarged, partially cut away perspective view of the secondary containment piping system shown carried by the metallic conduit used in the housing system of the present invention.
Figure 5:
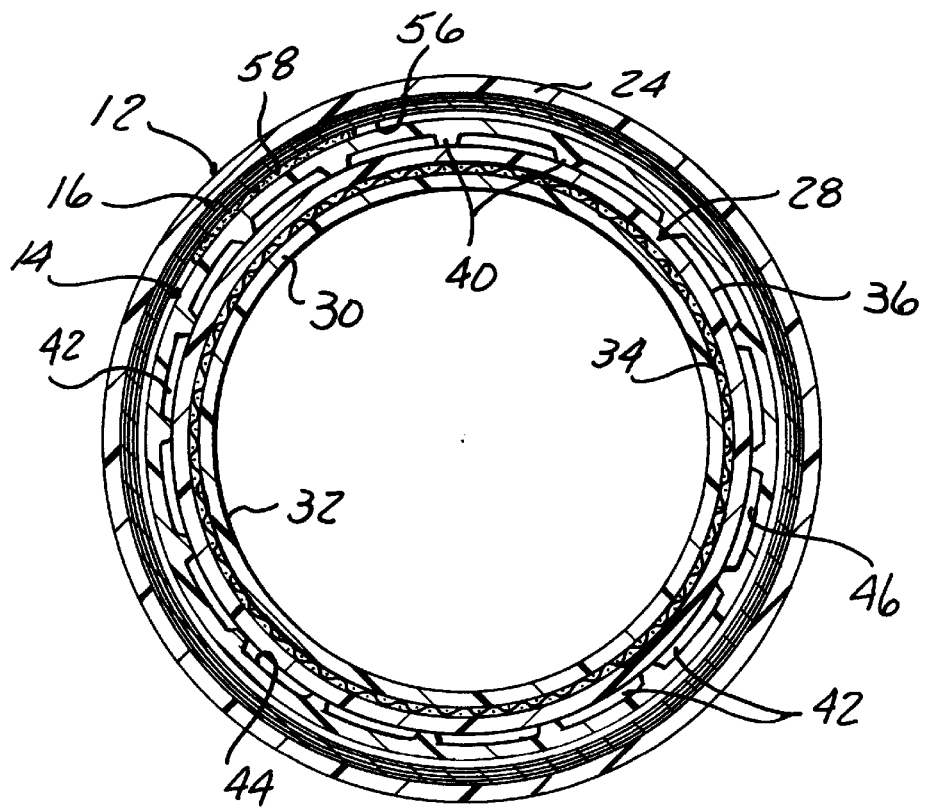
FIG. 5 is a cross sectional view taken on line 5—5 of FIG. 4.

Referring now to FIG. 1, a system for housing secondarily contained, or primary, non-secondarily contained flexible piping is designated generally as 10. As best seen in FIG. 2, housing system 10 comprises a flexible conduit 12 resistant to mechanical stresses. Conduit 12 is adapted to surround primary piping 54, as shown in FIG. 2, and/or secondarily contained flexible piping 14, as shown in FIGS. 4 and 5.

Figure 3:
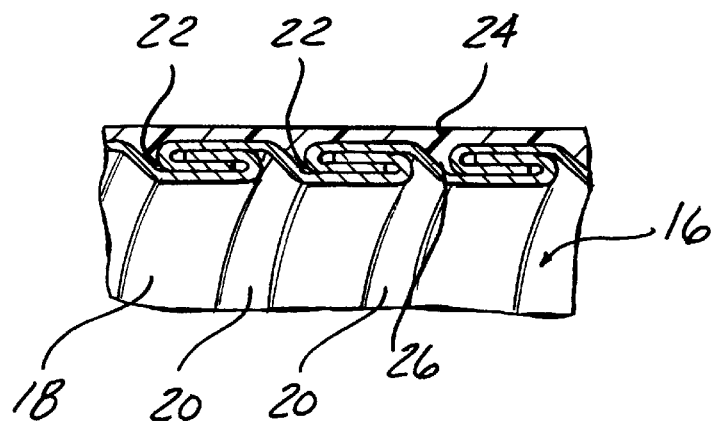
FIG. 3 is a cross sectional view taken on line 3—3 in FIG. 2.

Conduit 12 comprises a metallic core 16. It is to be understood that this core 16 may be formed by any suitable method and from any suitable material (including, for particular applications, a suitably strong, flexibly rigid, non-metallic material). However, in the preferred embodiment, this core 16 is formed from a continuously wound, galvanized steel strip 18. As best seen in FIG. 3, the strip 18 may be formed in an interlocking, "double strip wound" pattern, forming grooves 20 on the inner surface of core 16, and grooves 22 on the outer surface of core 16. Core 16 may further comprise a seamless, corrugated metal (not shown).

The housing system 10 may further comprise a thermoplastic jacket 24. It is to be understood that jacket 24 may be formed from any suitable material and by any suitable method. However, in the preferred embodiment, jacket 24 is formed from polyvinyl chloride (PVC). It may also be formed from polyethylene, rubber and/or a thermoset polymeric material, such as polyurethanes, thermoset polyesters, and the like. The PVC is extruded over the metallic core 16, fitting into grooves 22. This forms ribs 26 on the inner surface of jacket 24 which abuts core 16; and a substantially smooth outer surface of jacket 24. The ribs 26 also aid in preventing creepage of core 16 over time. Whatever material is chosen for jacket 24, it should be substantially impervious to water and hydrocarbons. In addition to being impervious to these materials, PVC as used in this application is also resistant to thermal influences, sunlight (ultraviolet radiation) and various chemicals; thereby making the housing system 10 also resistant to these substances. If these types of resistance are not necessary and/or desired, jacket 24 may be omitted from the present invention.

One example of a suitable core 16 with jacket 24 is commercially available from Anamet Electrical, Inc. in Mattoon, Ill. under the trademark ANACONDA SEAL-TITE® Type UA/EF. Any suitable diameter may be used for a particular application, and are available in many electrical trade sizes. In the preferred embodiment, the electrical trade size chosen is 2½". One illustrative example of a suitable core 16 with jacket 24 has an inside diameter of 2.505 inch; and an outside diameter of 2.875 inch. Other suitable inner diameters range between about 1 inch and about 5 inch.

The housing system 10 of the present invention is also able to withstand high compressive stress and tensile strain.

Additional fire protection may be added by including a thin, flexible, fluid-tight, fire resistant layer 52 between metallic core 16 and secondarily contained flexible piping 14. This layer may be formed of any suitable material, including but not limited to metals such as steel, copper and/or brass, and the like. In the preferred embodiment, a thin layer 52 of steel is used. The thin width provides flexibility while retaining fluid-tight communication. For illustrative purposes, in the preferred embodiment, the width of the layer 52 ranges between about 15 thousandths inch and about 30 thousandths inch.

Referring now to FIG. 5, further fire protection may be added by filling any interstice 56 between conduit 12 and primary 54 and/or secondary 14 piping with an insulative material 58. Examples of these materials include polyurethane foam; aluminum trihydrate powder with or without a binder and/or as a water slurry. These materials may be introduced to the interstice 56 in any suitable, conventionally known manner. It is to be understood that any insulative material may be used, and such materials may further be used which advantageously absorb heat and give off water, thereby aiding in quenching possible fires. It is to be understood that insulative material 58 may be used either separately from, or in conjunction with metallic pipe layer 52 in the housing system 10 of the present invention.

Referring now to FIGS. 4 and 5, the secondarily contained flexible piping 14 comprises an inner supply pipe 28. Inner supply pipe 28 may be comprised of any suitable material and by any suitable method—it could be a rubber and/or metallic hose; further, it may be formed from any suitable material in any suitable size, shape and configuration, including being formed from one or multiple layers. However, in the preferred embodiment, inner pipe 28 is comprised of a first, inner layer 30 fabricated from nylon and having a smooth, fluid-contacting interior portion 32. A suitable material for layer 30 is a nylon 12 material. Inner pipe 28 further comprises a second, intermediate layer 34 comprising a nylon reinforced wrap, such as a nylon 6 yarn reinforcement wrap; and a third, outer layer 36 comprising a polyethylene material. The nylon inner material 30, the nylon wrap 34 and the polyethylene outer layer 36 are extruded simultaneously to form the inner pipe 28. Inner pipe 28 may preferably be made from a fuel impervious material.

It is to be understood that any suitable diameters and thicknesses may be used for any components of the system 10, as desired and/or as required for a particular installation. In the preferred embodiment, the inner layer 30 is about 0.080" thick and the outer layer 36 is about 0.060" thick. Preferably, pipe 28 has an inside diameter of about 1.68" and an outside diameter of about 1.960", a maximum operating pressure of 150 psi and a minimum burst pressure of 750 psi. The material is flexible and has a bend radius of 12" to 24".

The secondarily contained flexible piping 14 further comprises a flexible outer secondary containment pipe 38 within which the inner supply pipe 28 is carried, the outer pipe 38 being fabricated from a suitable flexible material. It is to be understood that the outer pipe 38 may be formed from any suitable material in any suitable size, shape and configuration, including one or multiple layers. In the preferred embodiment, a plurality of radially projecting flanges 40 are disposed between the inner supply pipe 28 and the outer secondary containment pipe 38, to provide a snug and locking engagement of the pipes 28, 38 with respect to each other and to provide for a flow passage 42 between the pipes 28, 38. The view illustrated in FIG. 5 is exemplary of the condition that may exist.

It is to be understood that outer secondary containment pipe 38 may be formed from any suitable material and in any suitable manner; however, in the preferred embodiment, the flexible outer secondary containment pipe 38 is fabricated from an extruded material that is both chemically compatible with and impervious to the fluids to be transmitted therethrough. Some suitable examples of preferred materials include polyethylene, clear polyurethane, and clear acrylonitrile. Outer pipe 38 may be extruded separately from inner pipe 28, or may be coextruded therewith. The outer pipe 38 is sized to permit the inner pipe 28 to be inserted therein with little or no resistance and may be, preferably, assembled in the combined arrangement at the factory, and may additionally be assembled within conduit 12 at the factory, ready for positioning in the particular underwater or above-ground installation when delivered onsite. The outer pipe 38 is very flexible and can bend as needed to accommodate the bending of the primary inner pipe 28.

While it is preferred that the primary pipe 28, secondary containment pipe 38 and conduit 12 be assembled at a factory location, there may be situations in which the pipes are assembled on site before installation. The pipe 28 may be removed and any of the pipes may be replaced if a leak or any other defect is found during testing.

In another preferred embodiment, in order to achieve greater permeation resistance, outer pipe 38 may optionally be formed from a plasticized nylon 11, or a polyester elastomer used as a thermoplastic rubber. One such polyester elastomer is commercially available from E. I. du Pont de Nemours Co. under the tradename HYTREL. Outer pipe 38 may further be optionally formed from a coextrusion of low density polyethylene or SURLYN ionomer as an inner layer, and nylon 11 as an outer layer.

As seen in FIG. 5, the projecting flanges 40 may be formed integrally within circular interior wall 44, which flanges may extend the full length of piping 14, if desired. Wall 44 has a plurality of equally spaced radially projecting flanges 40 which define thereinbetween U-shaped openings 46 which abut the outer layer 36 of the inner pipe 28. The U-shaped openings 46 provide minimum flow passage 42 communicating any fluid that may leak from the inner pipe 28 to a preselected collection point (not shown) which may be monitored by an appropriate monitoring device (not shown).

As seen in FIG. 4, the plurality of radially projecting flanges 40 project outwardly and are formed in the inner pipe outer layer 36, thereby providing the same minimum flow passage 42.

In a further embodiment, if secondary containment is not necessary and/or desired, a primary system 54 may be housed within flexible conduit 12, as seen in FIG. 2. Examples of primary systems may include chemical plant hose, marinas, and feed and return lines for emergency generators. Illustrative examples of a primary pipe 54 includes rubber and/or metal hose, and other suitable non-synthetic or synthetic materials, including suitable thermoplastic materials. This primary pipe 54 may be of any suitable size, shape and configuration, and may be formed from one or multiple layers. In the preferred embodiment, the primary pipe 54 is configured as described in relation to inner pipe 28.

As can be seen in FIG. 1, the present invention may successfully be used under water W and above ground G. Suitable support structures 48 may or may not be used, as necessary and/or desired. In underwater installations, the metallic core 16 generally provides enough weight for sinking the housing system 10 beneath the water; further, the addition of fluid communicating through the primary and/or secondary piping therewithin adds further weight for this purpose. However, in some instances, it may be necessary and/or desirable to use support structures 48 for this purpose and/or to hang suitable weights over portions of the housing system 10. Still further, in some cases, it may be desirable to have the housing system 10 float near the surface of the water W. The housing system 10 is shown carrying the secondarily contained piping system 14 in a liquid-tight, waterproof manner through the water W to an above ground G storage tank 50. For illustrative purposes, a portion of the flexible conduit 12 has been broken away to expose the secondarily contained piping system 14 carried therein.

For connection to tank 50 and/or at various points wherein T junctions and the like are desired, conventional seals may surround the outer surface of the containment pipe 38 to provide a fluid tight seal. Further, standard fittings and entry boots for liquid tight conduits may be used.

The outer containment pipe 38 may extend into the collection point (or other suitable area) a sufficient distance so that it clears the interior of the collection point. During fabrication this will permit the insertion on the terminated end of pipe 38 of a suitable air pressure device to permit testing in the following manner. Before a coupling is attached to the inner pipe 28, an appropriate seal may be placed over the outside of the inner pipe 28 to sealingly engage the outer pipe 38 whereby pressurized air may be communicated to the flow passage 42 formed between the inner and outer pipes 28 and 38 to test the same to be sure that there are no leakage points in the containment system. Obviously, the opposite ends of the pipe 38 from each of the collection points must be sealed in order to effectively perform such a test. Likewise, the inner pipes 28 can be subjected to air pressure to test their integrity. Once the installer is satisfied that the containment piping system is able to perform its function without concern for leakage, the installation of the system 10 may be completed onsite.

The inner pipe 28 may extend past the terminated end of the outer pipe 38 a sufficient distance to permit it to be coupled by suitable conventional couplings to another inner pipe 28 (if desired) which, in turn may extend outwardly from the collection point through a further outer containment pipe 38.

The collection point will have a means for removal of any fuel or fluid that might be captured by the containment pipe 38. A fluid sensor (not shown) may be disposed in the bottom of the collection point and is electrically connected to an appropriate indicator or alarm (not shown). When there is an accumulation of fluid, such as due to leakage from the primary pipe 28, the fluid will actuate the alarm.

Centralizing spacers (not shown) between one of the primary 54 and/or secondary 14 piping and the conduit 12 may be used. Without use of such spacers, the primary 54 and/or secondary 14 piping may or may not rest on the bottom of conduit 12, as depicted in FIG. 5.

The present housing system 10 offers many advantages including, but not limited to the following. As can be seen in FIG. 1, the housing system 10 is flexible enough to bend around existing structures and/or sea terrain. Depending upon the size of the primary 54 and/or secondary 14 piping used, the bend radius may range between about 6" and about 36". As an illustrative example, in the preferred embodiment, a 1.75" secondary pipe 14 within a 2.5" conduit 12 has a bend radius of about 10", which is a greater bend radius than pipe 14 not contained within the conduit 12. Discrete sections of the primary 28 and secondary 38 piping may be removable for ease in installation. Once the system is installed, the pipes 28, 38 are generally not removable. The conduit 12, with or without thermoplastic jacket 24, protects the secondary containment piping 14 from external damage, and from degradation from ultraviolet rays. The system 10 is waterproof; and it also provides sufficient protection to the piping 14 from external loads such as boat props and the like. Further, the conduit 12 may house both a supply and return line (not shown); each of which may or may not be secondarily contained.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A system for housing secondarily contained flexible piping, the housing system comprising:
    a flexible conduit resistant to mechanical stresses, the conduit adapted to surround the secondarily contained flexible piping, the conduit comprising a metallic core; and
    secondarily contained flexible piping, the piping comprising:
        an inner supply pipe fabricated from a material that is both chemically compatible with and impervious to the fluids to be transmitted therethrough; and
        a flexible outer secondary containment pipe within which the inner supply pipe is carried;
    wherein the housing system withstands high compressive stress and tensile strain.

2. The system for housing secondarily contained flexible piping as defined in claim 1 wherein the inner pipe is comprised of a first, inner layer fabricated from nylon, a second, intermediate layer comprising a nylon reinforced wrap, and a third, outer layer comprising a polyethylene material, the nylon inner material, the nylon wrap and the polyethylene outer layer being extruded simultaneously to form the inner pipe.

3. The system for housing secondarily contained flexible piping as defined in claim 1 wherein the outer pipe is fabricated from a polymeric material, and wherein the secondarily contained flexible piping further comprises a plurality of radially projecting flanges disposed between the inner supply pipe and the outer secondary containment pipe, the flanges providing a locking engagement of the pipes with respect to each other and further providing for a flow passage between the pipes.

4. The system for housing secondarily contained flexible piping as defined in claim 1 wherein the conduit further comprises a thermoplastic jacket surrounding the metallic core.

5. A system for housing secondarily contained flexible piping, the housing system comprising:
    a flexible conduit resistant to mechanical stresses, the conduit adapted to surround the secondarily contained flexible piping, the conduit comprising a metallic core, wherein the metallic core is formed from galvanized steel strip; and
    secondarily contained flexible piping, the piping comprising:
        an inner supply pipe fabricated from a material that is both chemically compatible with and impervious to the fluids to be transmitted therethrough; and
        a flexible outer secondary containment pipe within which the inner supply pipe is carried.

6. The system for housing secondarily contained flexible piping as defined in claim 5 wherein the core is formed by continuously winding the steel strip.

7. A system for housing secondarily contained flexible piping, the housing system comprising:
    a flexible conduit resistant to mechanical stresses, the conduit adapted to surround the secondarily contained flexible piping, the conduit comprising a metallic core and a thermoplastic jacket surrounding the metallic core, wherein the thermoplastic jacket is formed from polyvinyl chloride; and
    secondarily contained flexible piping, the piping comprising:
        an inner supply pipe fabricated from a material that is both chemically compatible with and impervious to the fluids to be transmitted therethrough; and
        a flexible outer secondary containment pipe within which the inner supply pipe is carried.

8. The system for housing secondarily contained flexible piping as defined in claim 7 wherein the jacket is substantially impervious to water and hydrocarbons.

9. The system for housing secondarily contained flexible piping as defined in claim 8 wherein the jacket has an outer, substantially smooth surface and an inner, core-abutting, ribbed surface.

10. The system for housing secondarily contained flexible piping as defined in claim 1 wherein the housing system is heat resistant.

11. The system for housing secondarily contained flexible piping as defined in claim 1 wherein the flexible outer secondary containment pipe is fabricated from an extruded material that is both chemically compatible with and impervious to the fluids to be transmitted therethrough.

12. The system for housing secondarily contained flexible piping as defined in claim 1 wherein the secondary containment pipe is fabricated from a polyethylene material.

13. The system for housing secondarily contained flexible piping as defined in claim 1 wherein the secondary containment pipe is fabricated from a clear polyurethane material.

14. The system for housing secondarily contained flexible piping as defined in claim 1 wherein the secondary containment pipe is fabricated from a clear acrylonitrile material.

15. The system for housing secondarily contained flexible piping as defined in claim 1 wherein the flexible outer secondary containment pipe is a circular integral wall, the interior of which has a plurality of equally spaced radially projecting flanges which define thereinbetween U-shaped openings which abut the outer layer of the inner pipe, the U-shaped openings providing minimum flow passage communicating any fluid that may leak from the inner pipe to a collection point.

16. The system for housing secondarily contained flexible piping as defined in claim 3 wherein the plurality of radially projecting flanges project outwardly and are formed in the inner pipe outer layer.

17. The system for housing secondarily contained flexible piping as defined in claim 8 wherein the system is installed underwater.

18. The system for housing secondarily contained flexible piping as defined in claim 8 wherein the system is installed above-ground.

19. The system for housing secondarily contained flexible piping as defined in claim 1, further comprising at least one of a thin, flexible, fluid-tight, fire resistant metallic pipe layer and an insulative, fire resistant material layer disposed between the metallic core and the secondarily contained flexible piping.

20. A system for housing secondarily contained flexible piping, the housing system comprising:
    a flexible conduit resistant to mechanical stresses, the conduit adapted to surround the secondarily contained flexible piping, the conduit comprising:

a continuously wound, galvanized steel strip metallic core; and a polyvinyl chloride thermoplastic jacket, substantially impervious to water and hydrocarbons, the jacket having an outer, substantially smooth surface and an inner, core-abutting, ribbed surface; and secondarily contained flexible piping, the piping comprising:

an inner supply pipe, wherein the inner pipe is comprised of a first, inner layer fabricated from nylon, a second, intermediate layer comprising a nylon reinforced wrap, and a third, outer layer comprising a polyethylene material, the nylon inner material, the nylon wrap and the polyethylene outer layer being extruded simultaneously to form the inner pipe; and a flexible outer secondary containment pipe within which the inner supply pipe is carried, the outer pipe being fabricated from a polymeric material and having a plurality of radially projecting flanges disposed between the inner supply pipe and the outer secondary containment pipe, to provide a locking engagement of the pipes with respect to each other and to provide for a flow passage between the pipes;

wherein the housing system is heat resistant and withstands high compressive stress and tensile strain.

21. The system for housing secondarily contained flexible piping as defined in claim 20 wherein the system is adapted to be installed underwater.

22. The system for housing secondarily contained flexible piping as defined in claim 20 wherein the system is adapted to be installed above-ground.

23. The system for housing secondarily contained flexible piping as defined in claim 20 wherein the system is resistant to ultraviolet radiation.

24. A system for housing a flexible, primary piping system having a pipe supplying a fluid between a first location and a second location, the housing system comprising:

a flexible conduit resistant to mechanical stresses, the conduit adapted to surround the primary piping system in at least one of an underwater installation and an above-ground installation, the conduit comprising:

a continuously wound, galvanized steel strip metallic core; and a polyvinyl chloride thermoplastic jacket, substantially impervious to water and hydrocarbons, the jacket having an outer, substantially smooth surface and an inner, core-abutting, ribbed surface; and flexible, primary piping fabricated from a material that is both chemically compatible with and impervious to the fluids to be transmitted therethrough;

wherein the housing system is heat resistant and withstands high compressive stress and tensile strain.

25. The system for housing flexible, primary piping system as defined in claim 24 wherein the primary piping comprises:

a first, inner layer fabricated from nylon;

a second, intermediate layer comprising a nylon reinforced wrap; and a third, outer layer comprising a polyethylene material;

wherein the nylon inner material, the nylon wrap and the polyethylene outer layer are extruded simultaneously to form the primary piping.

26. The system for housing a flexible, primary piping system as defined in claim 24 wherein the housing system is resistant to ultraviolet radiation.

27. The system for housing a flexible, primary piping system as defined in claim 24, further comprising at least one of a thin, flexible, fluid-tight, fire resistant metallic pipe layer and an insulative, fire resistant material layer disposed between the metallic core and the primary piping.

28. A system for housing a flexible, primary piping system having a pipe supplying a fluid between a first location and a second location, the housing system comprising:

a flexible conduit resistant to mechanical stresses, the conduit adapted to surround the primary piping system, the conduit comprising a metallic core; and flexible, primary piping fabricated from a material that is both chemically compatible with and impervious to the fluids to be transmitted therethrough;

wherein the housing system withstands high compressive stress and tensile strain.

29. The system for housing a flexible, primary piping system as defined in claim 28 wherein the primary piping comprises:

a first, inner layer fabricated from nylon;

a second, intermediate layer comprising a nylon reinforced wrap; and a third, outer layer comprising a polyethylene material;

wherein the nylon inner material, the nylon wrap and the polyethylene outer layer are extruded simultaneously to form the primary piping.

30. The system for housing a flexible, primary piping system as defined in claim 28 wherein the housing system is resistant to ultraviolet radiation.

31. The system for housing a flexible, primary piping system as defined in claim 28 wherein the metallic core is formed from galvanized steel strip.

32. The system for housing a flexible, primary piping system as defined in claim 31 wherein the core is formed by continuously winding the steel strip.

33. The system for housing a flexible, primary piping system as defined in claim 28 wherein the conduit further comprises a thermoplastic jacket surrounding the metallic core.

34. The system for housing a flexible, primary piping system as defined in claim 33 wherein the thermoplastic jacket is formed from polyvinyl chloride.

35. The system for housing a flexible, primary piping system as defined in claim 34 wherein the jacket is substantially impervious to water and hydrocarbons.

36. The system for housing a flexible, primary piping system as defined in claim 35 wherein the conduit is adapted to surround the primary piping system in at least one of an underwater installation and an above-ground installation.

37. The system for housing a flexible, primary piping system as defined in claim 29 further comprising at least one of a thin, flexible, fluid-tight, fire resistant metallic pipe layer and an insulative, fire resistant material layer disposed between the metallic core and the primary piping.

* * * * *